US008262166B2

(12) United States Patent
Stuijt et al.

(10) Patent No.: US 8,262,166 B2
(45) Date of Patent: Sep. 11, 2012

(54) ARM SUPPORT, AND SITTING SUPPORT WITH SUCH ARM SUPPORT

(75) Inventors: Henricus Johannes Adrianus Stuijt, Lobith (NL); Gijs Kramer, Nijmegen (NL); Gerardus Richardus Bernardus Engelina Römer, 's-Heerenberg (NL)

(73) Assignee: Exact Dynamics B.V., Didam (NL)

(*) Notice: Subject to any disclaimer, the term of this patent is extended or adjusted under 35 U.S.C. 154(b) by 0 days.

(21) Appl. No.: 13/242,523

(22) Filed: Sep. 23, 2011

(65) Prior Publication Data

US 2012/0007334 A1 Jan. 12, 2012

Related U.S. Application Data

(63) Continuation of application No. 12/136,895, filed on Jun. 11, 2008, now Pat. No. 8,113,590.

(30) Foreign Application Priority Data

Jun. 11, 2007 (NL) ..................................... 1033964

(51) Int. Cl.
*B60N 2/46* (2006.01)
*B60N 2/42* (2006.01)

(52) U.S. Cl. ......... 297/411.35; 297/411.36; 297/411.37; 297/411.38; 248/118.3; 248/280.11; 248/281.11

(58) Field of Classification Search .................. 297/411.35–411.39; 248/118.1, 248/118.3, 118.5, 282.1, 280.11, 281.11
See application file for complete search history.

(56) References Cited

U.S. PATENT DOCUMENTS

| | | | | | |
|---|---|---|---|---|---|
| 2,953,191 | A | * | 9/1960 | Brendel | 248/565 |
| 4,069,995 | A | * | 1/1978 | Miller | 248/118.1 |
| 4,620,697 | A | * | 11/1986 | Pithon | 5/640 |
| 4,872,727 | A | * | 10/1989 | Rye | 297/411.36 |
| 5,029,941 | A | * | 7/1991 | Twisselmann | 297/411.38 |
| 5,074,501 | A | * | 12/1991 | Holtta | 248/118.3 |
| 5,536,070 | A | * | 7/1996 | Lemmen | 297/411.37 |
| 5,571,274 | A | * | 11/1996 | Holstensson | 297/411.38 |
| 5,713,591 | A | * | 2/1998 | Zarkhin et al. | 280/250.1 |
| 5,884,975 | A | * | 3/1999 | Su | 297/411.35 |
| 5,927,815 | A | * | 7/1999 | Nakamura et al. | 297/411.38 |
| 5,984,408 | A | * | 11/1999 | Bujaryn | 297/323 |
| 6,042,064 | A | * | 3/2000 | Hong | 248/118.5 |

(Continued)

FOREIGN PATENT DOCUMENTS

| | | |
|---|---|---|
| GB | 1190689 | 5/1970 |
| WO | 89/00111 A1 | 1/1989 |

OTHER PUBLICATIONS

NL1033964 International Search Report.

*Primary Examiner* — Laurie Cranmer
(74) *Attorney, Agent, or Firm* — Banner & Witcoff, Ltd.

(57) ABSTRACT

An arm support, comprising an arm supporting element, connected via a connecting device with a lift device, wherein the arm supporting element has a longitudinal direction between a front end and a rear end and is connected via a tilting axis (E) with the connecting device, which tilting axis (E), in top plan view, is situated between the front end and the rear end, wherein the lift device comprises compensation means for bearing the weight of the arm support and a load borne thereon, in particular an arm of a user.

19 Claims, 9 Drawing Sheets

U.S. PATENT DOCUMENTS 6,132,001 A * 10/2000 Su ............................ 297/411.36
6,203,109 B1 * 3/2001 Bergsten et al. ......... 297/411.35
6,464,183 B1 * 10/2002 Bouhuijs ....................... 248/118
7,461,423 B2 * 12/2008 Rutherford et al. ............... 5/646
7,581,791 B2 * 9/2009 Diffrient .................. 297/411.35
2005/0012376 A1 1/2005 Siminovitch et al.
2006/0186292 A1 * 8/2006 Rutherford et al. ........ 248/276.1
2007/0228230 A1 * 10/2007 Papendieck et al. .......... 248/126

* cited by examiner

| *Dynamic Arm Support Functions* | *button 1* | *button 2* | *button 3* |
|---|---|---|---|
| Compensation force more/less (↑/↓) | Fc↑ | Fc↓ | -(N/A) |
| Additional function 1 on/off | toggle | -(N/A) | press (Shift) |
| Additional function 2 on/off | -(N/A) | toggle | press (Shift) |

ARM SUPPORT, AND SITTING SUPPORT WITH SUCH ARM SUPPORT

RELATED APPLICATION DATA

This application is a continuation of U.S. patent application Ser. No. 12/136,895 and filed Jun. 11, 2008; which claims the benefit of NL patent application number 1033964 and filed Jun. 11, 2007 both of which are hereby incorporated by reference in their entireties.

FIELD

The invention relates to an arm support.

BACKGROUND

For persons having a reduced arm function, such as, for instance, limited muscular strength, an arm support can be of interest, for instance to stabilize a forearm and to improve the use of, for instance, a wrist and hand.

To that end, dynamic arm supports have been developed. However, these are technically complex, often have singular points in a normal range of use and require various adaptations to, for instance, a wheelchair in which they are used. Moreover, limitations in use, such as limited envelopes of movement and the like, can occur.

SUMMARY

The object of the invention is to provide an arm support, in particular a dynamic arm support.

In a first aspect, an arm support according to the invention is characterized by claim 1.

The tilting axis enables movement of a forearm situated on the arm supporting element, such as an arm tray, while the lift device enables relative vertical movement.

Advantageously, the lift device can comprise compensation means, such that, upon a vertical movement of the forearm, or at least of a center of gravity thereof, the lift device, and hence the arm supporting element, follows this movement and contact between the arm and the arm supporting element is preserved. With the arm at rest, there is preferably a force equilibrium between gravity and the compensation means.

The invention furthermore relates to a sitting support according to claim 12.

In a first aspect, a sitting support is provided with a seat, while the lift device of the arm support, in top plan view, extends substantially next to and/or below the seat.

The invention furthermore relates to a lift device of or for an arm support or sitting support.

BRIEF DESCRIPTION OF THE DRAWINGS

To clarify the invention, exemplary embodiments of the arm support and method according to the invention will be further elucidated with reference to the drawing. In the drawing:

FIG. 12 shows in top plan and front view a portion of an arm support, with axes of movement drawn in.

DETAILED DESCRIPTION OF CERTAIN PREFERRED EMBODIMENTS

Figure 1:
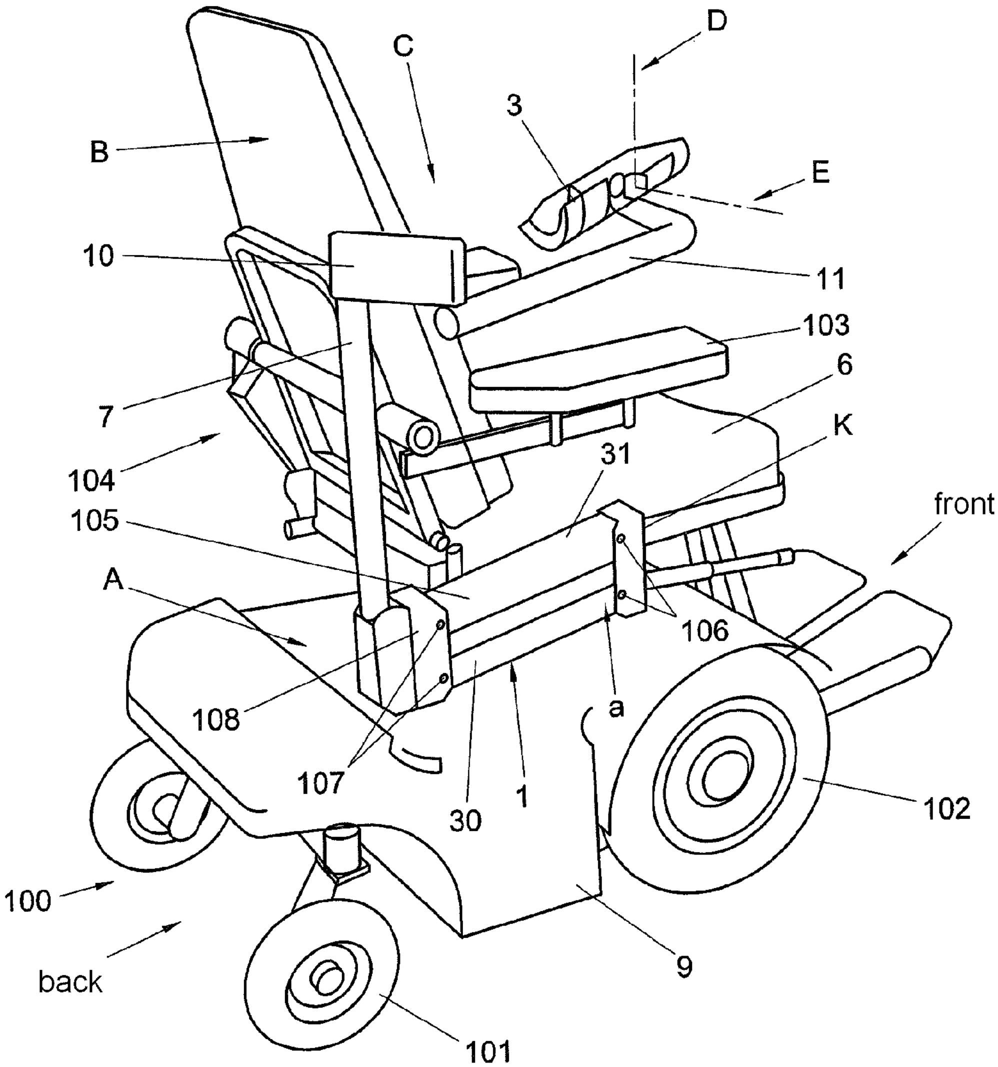
FIG. 1 shows in perspective view, obliquely from behind, a wheelchair with arm support.
Figure 2:
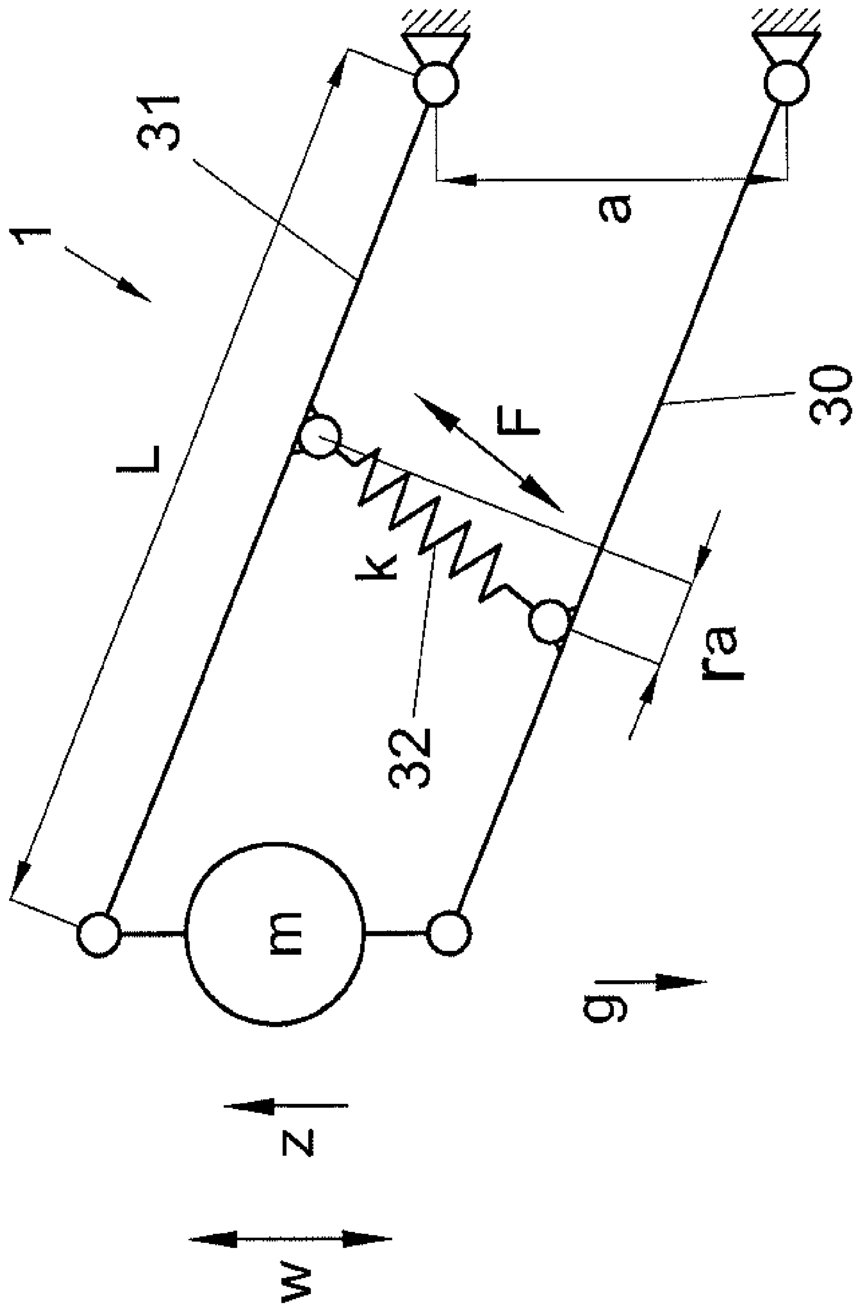
FIG. 2 schematically shows a lift device.

In this description, the same or corresponding parts have the same or corresponding reference numerals. The embodiments are shown only by way of illustration and should not be construed as limiting the invention in any way. In particular, also combinations of parts thereof are understood to be within the scope of the invention.

In this description, an arm support and sitting support will be described substantially with reference to a wheelchair and a user who is sitting in the wheelchair. Wheelchairs are known per se. The wheelchair will therefore be described only to a limited extent.

Figure 5:
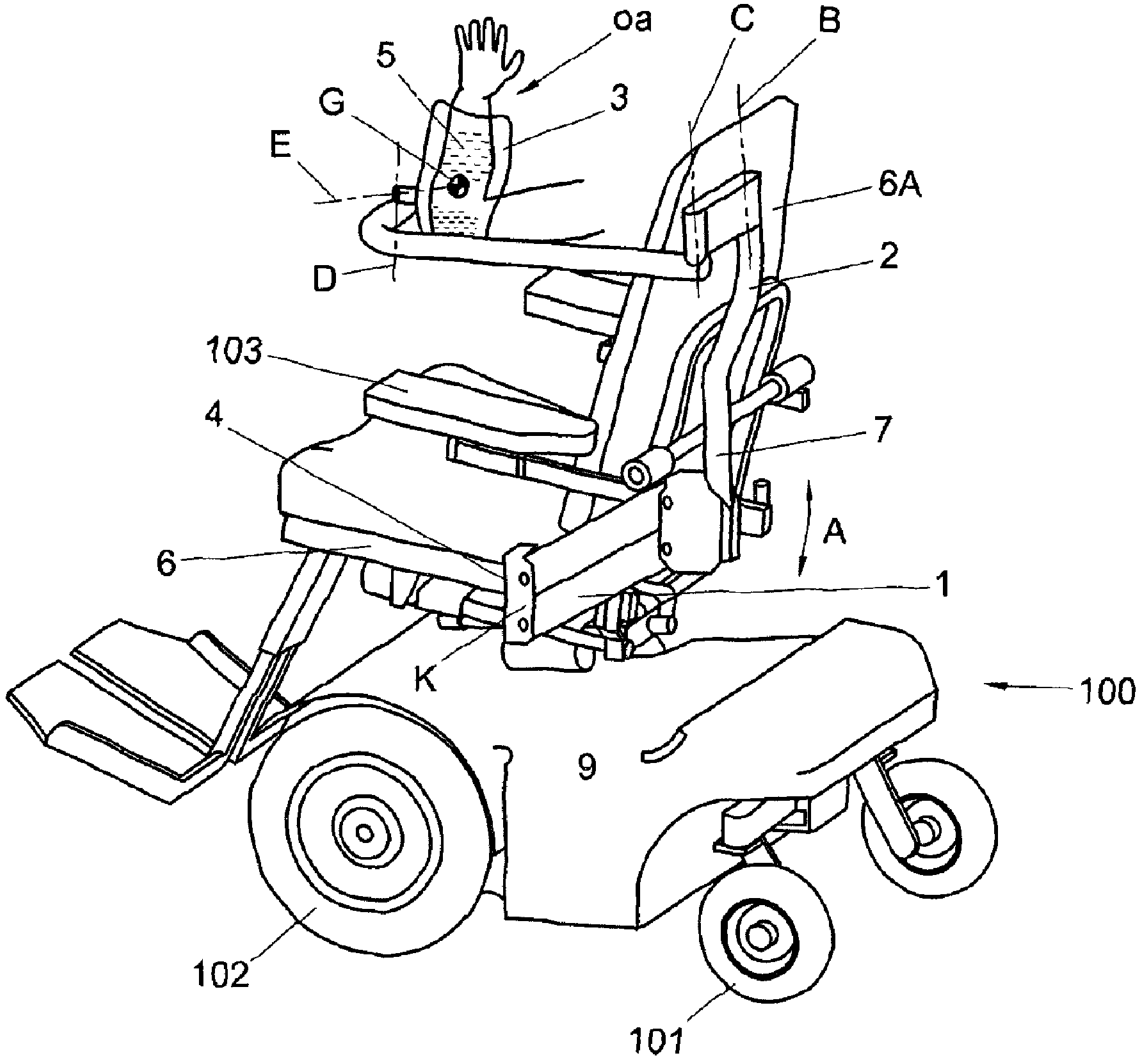
FIG. 5 shows a wheelchair comparable to FIG. 1, with the arm support placed on the opposite side.
Figure 6B:
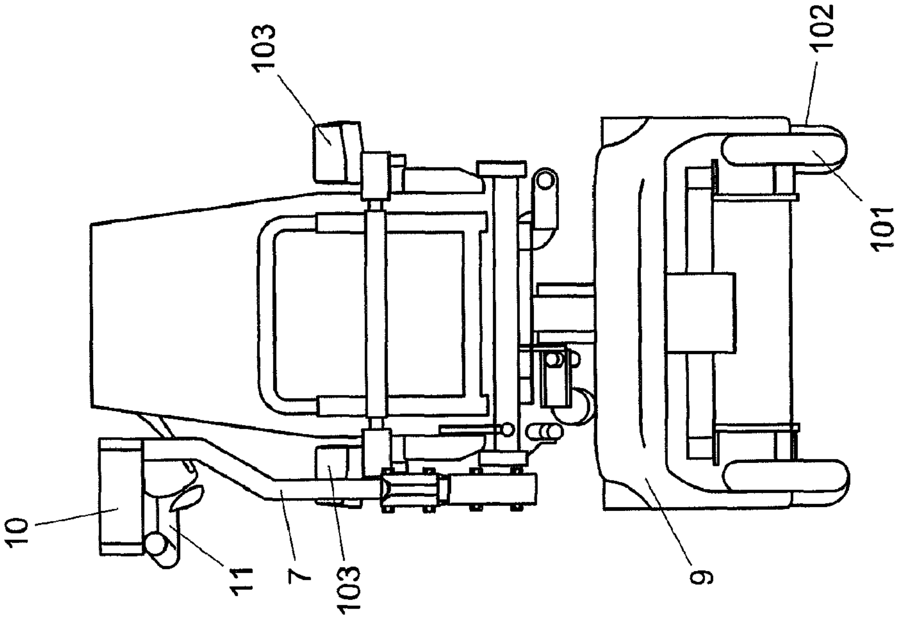
FIGS. 6A and B show a wheelchair with arm support in top plan view and rear view, respectively.
Figure 6A:
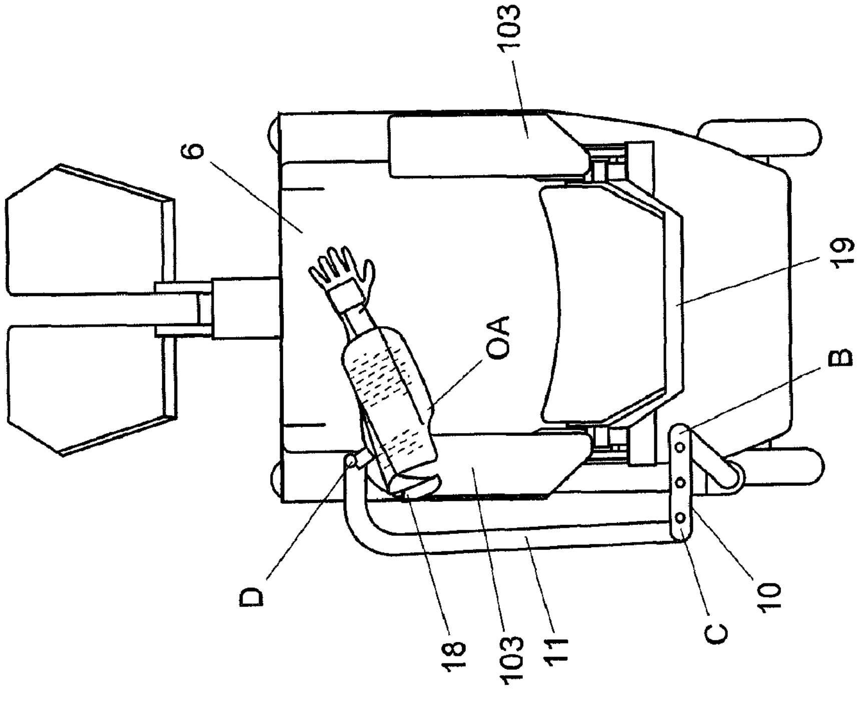

FIGS. 1, 5 and 6 show a wheelchair 100, provided with wheels 101, 102. In this embodiment, an electric wheelchair 100 is shown, provided with two swiveling wheels 101 at the rear and two driven wheels 102 at the front. On an undercarriage 9 borne by the wheels 101, 102, in which a motor and batteries are provided and, optionally, control electronics, a seat 6 is supported, and a back 6A. Armrests 103 may be provided on opposite sides. To the seat 6, an arm support 104 is attached via mounting K. This comprises a lift device 1, connecting means 2 and an arm supporting element, such as an arm tray 3.

In the drawing, there where applicable, of a user only a (fore)arm OA is schematically shown.

The lift 1 has a parallelogram 105, with two parallel arms, each attached to the seat in a first pivoting point 106 and connected to a bracket 108 through a second pivoting point 107. Pivoting points 106 and 107 are situated in pairs at a distance a.

Each arm comprises a cover section 109 having a U-shaped cross section, which forms a tube or guard 17. They may wholly or partly determine a maximum pivoting angle of the lift device, or at least of the arms 30, 31 around the pivoting points 106, 107. Attached to the bracket 108 is a tube or other section 7.

The dynamic arm support (DAS) may be built up modularly from three parts or can comprise at least three such parts, viz. a vertical unit or lift 1, hereinafter also referred to as lift device, as represented for instance in FIG. 1 and in FIG. 5, a connecting assembly or connecting device or rod assembly 2, and an arm cup or arm tray 3. All may be freely detachable, as without tools, for instance in case of transport of the user in the wheelchair by taxi or, for instance, at a (horizontal) transfer into and out of the wheelchair. Only detaching the lift requires two nuts or the like to be loosened at the wheelchair attachment 4.

A forearm of a user may be situated in the arm tray, such that the composite center of gravity G of the arm is situated on a tilting axis E of the arm tray 3. This center of gravity G exists and is situated at roughly ⅓ of the length of the forearm from the elbow; this is where the arm can be lifted with a string, as it were, without this causing a limp arm to hang or tilt into a different position.

The dynamic arm support 5 can have five degrees of freedom (DOF) A through E, of which one (A) in the lift, three owing to the rod assembly in the horizontal plane (B to D), and one (E) in the tilt of the arm tray. See FIGS. 5 and 5A.

The dynamic arm support has a degree of freedom (A) on which weight compensation acts, viz. in the lift. Gravity g also acts in one direction only, so the device is not unnecessarily complex in setup. This degree of freedom A is in the vertical unit, which can for instance be a torsion-stiff parallelogram construction, as shown in more detail in for instance FIGS. 2, 7A, 7B, 8 and 9. The vertical unit 1, viewed in forward and backward direction, is mounted approximately halfway a wheelchair seat 6, and from there projects rearwards, preferably as far as possible outside the view of the user. The lift 1 can extend rearwards because that is where, on wheelchairs, there is space for the aid such as the dynamic arm support, so that it can work from the shoulder and does not make the wheelchair wider. A tube 7—see FIG. 6—bridges the distance from the lift 1 to a point behind the shoulder of a user sitting in the wheelchair, for instance at or above the level of an armrest 103 of a wheelchair 100.

Two parts 10 and 11 of the connection 2 between axes B and C and C and D can provide for free movement (both front/back and left/right) and rotation in the horizontal plane. The first part 10 is then preferably connected to the tube 7 so as to be pivotable about the axis B, and connected pivotably about axis C to the second part 11 which is connected to the tray or arm cup 3. The second part 11 comprises for instance a bent tube and the first part can for instance be a tube or block or be formed by a rod mechanism. The arm cup 3 can preferably tilt about the tilting axis E and allows rotation (pronation and supination) of the hand about the axis of the wrist. Movement in the horizontal plane preferably takes place above armrest level, so that the DAS does not need to make a wheelchair wider.

By means of the tube 7, the pivoting point B in FIG. 6 can be placed close to the human shoulder, in particular slightly inwards from the armrest, so that the rod assembly can run from there closely along the body and the seat. The rod assembly is preferably situated adjacent the center of gravity G in the forearm.

The lift 1 preferably has a compensation device which preferably works according to a weight compensation principle for a single DOF. Here, this is shown with a parallel or parallelogram construction with two parallel rods 30, 31 between pivoting points Q and S, comparable to points 106 in FIG. 1, and pivoting points P and R, comparable to points 107 in FIG. 1. A linear spring 32 can be used, with the force F being preferably zero, or at least minimal, if the length is minimal. Preferably, a linear spring is used, or an assembly of a number of such springs, with the spring force being directly proportional to the elongated length instead of merely to the elongation. With such a spring, in an unelongated (minimum) length, the bias is equal to that length times the spring constant k. Such springs can also be designated as springs without free length. What applies then for each length within the elastic working range of the spring is F=k*L, wherein F is the spring force, k the spring constant and L the total length of the spring. The resultant force up is now constant over the vertical stroke W. The following equation applies:

$$m \cdot g \cdot L = r_a \cdot a \cdot k,$$

wherein m is the mass of the weight borne by the weight compensation principle, including the arm of the user, g is the earth's gravitation, L is the length of the arms 30, 31, $r_a$ is the distance between the two points of application of the spring 32 on the arms 30, 31, measured at right angles to the longitudinal direction L of the arms, a is the distance between the pivoting points 33, 34 of the arms 30, 31, and k is the spring constant.

Figure 7A:
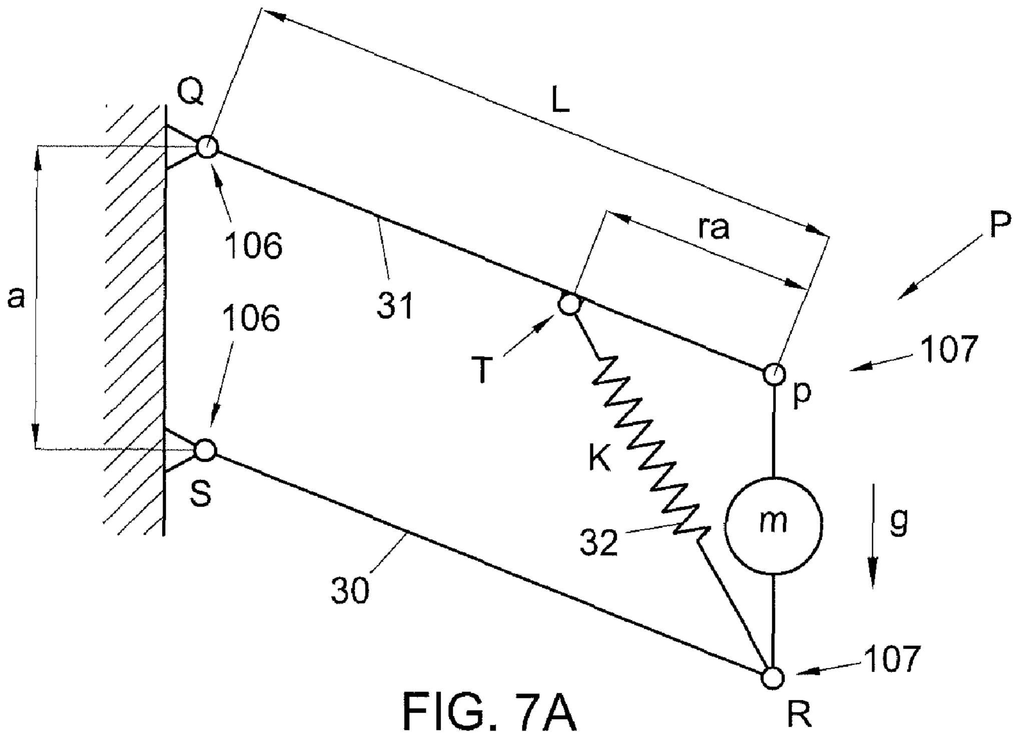
FIGS. 7A and B schematically show two alternative embodiments of a lift device or at least a compensation device.
Figure 7B:
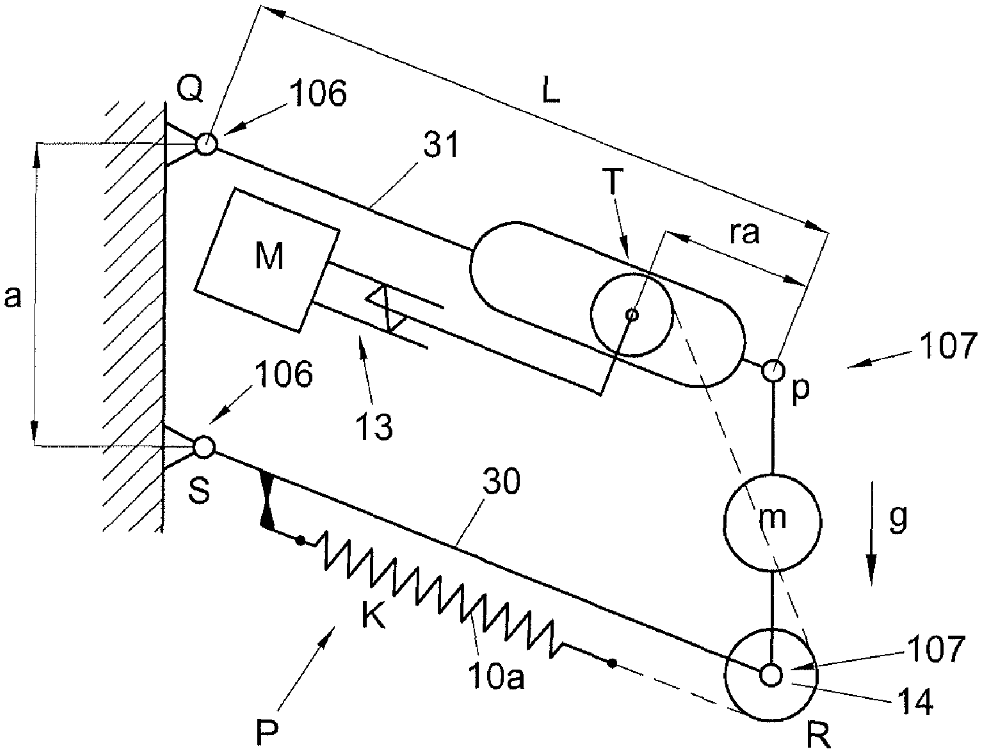
Figure 8:
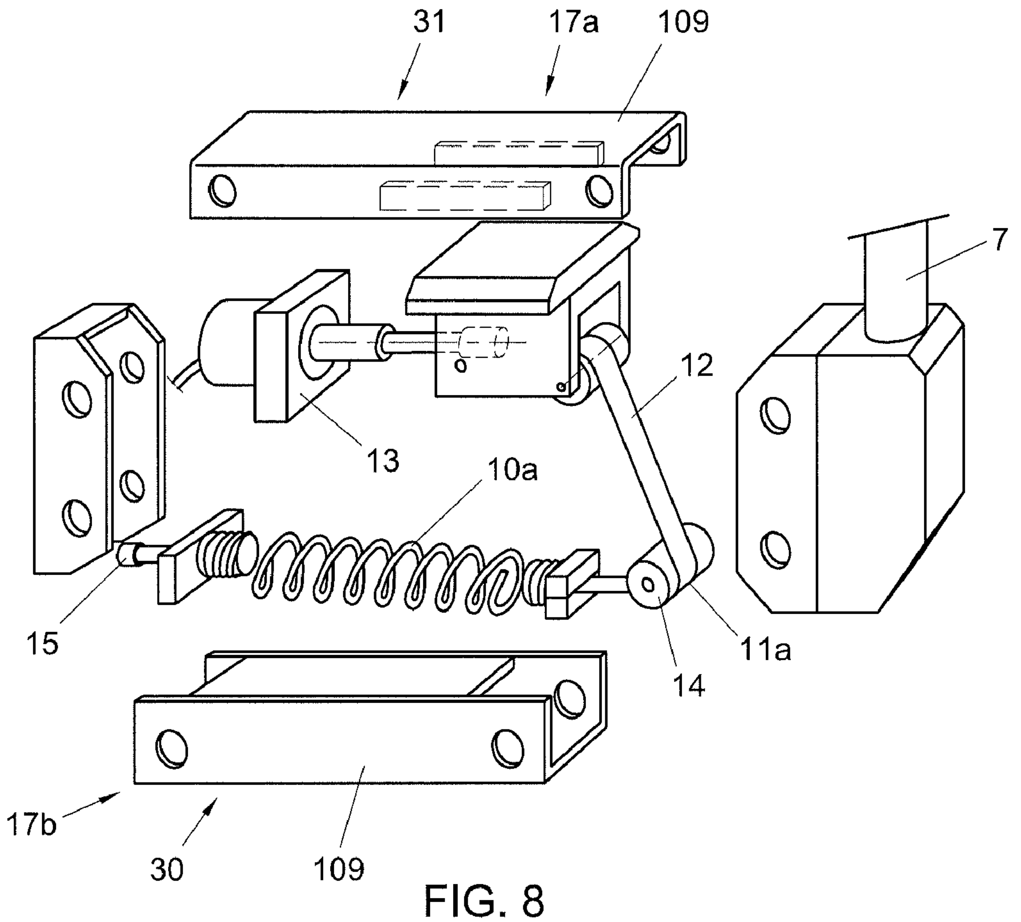
FIG. 8 shows partly in exploded view a lift device with compensation means.

Replacing a spring 32 as in FIG. 7A by a common draw spring with free length (10*a*) and a cable-pulley system 11*a* as in FIG. 8 and FIG. 7B is possible, preferably such that the action of a spring without free length is approximated. A cable-pulley setup as can be used in a DAS is depicted in FIG. 8 and schematically in FIG. 7B and furthermore in the sectional view of the lift in FIG. 9.

Figure 9:
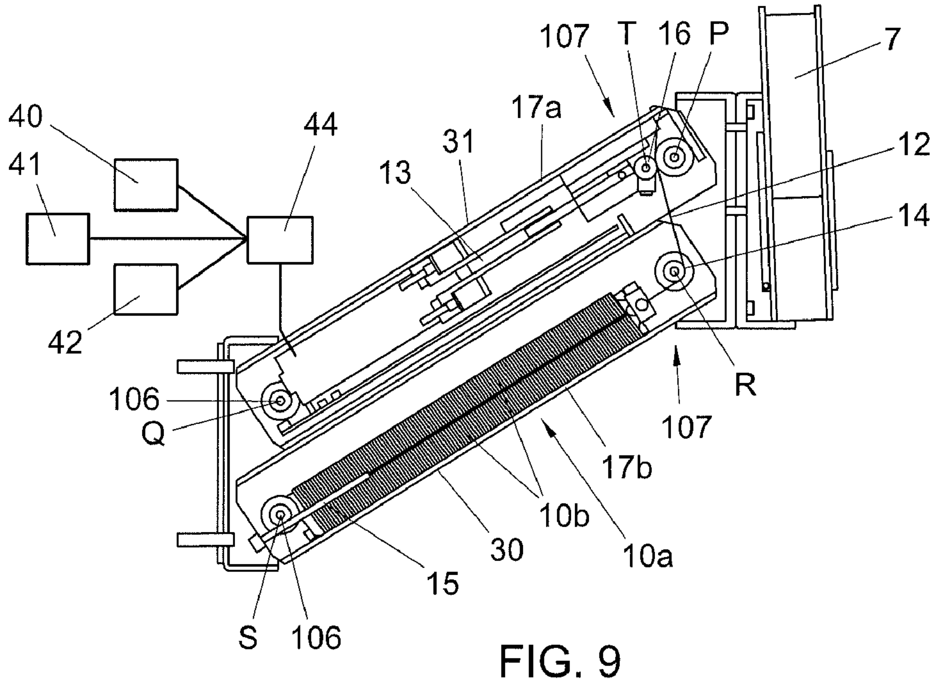
FIG. 9 shows in partly sectional side elevation a lift device with compensation means.

A suspension point T in FIG. 9 of the cable or cord 12 in FIGS. 7B and 8 and 9, for instance designed as a thin ribbon 12 of a high tensile strength, such as a Kevlar woven ribbon, is movable on the line P-Q with the aid of a linear actuator 13 with motor M in FIGS. 8 and 9, so that the compensation force of the DAS is adjustable. The force supplied is linearly dependent on the position of suspension point T on the line P-Q, viz. on the distance P-T, that is, $R_a$ in equation 1.

The pulley 14 over which the cable 12 runs is situated at the same place as the hinge point R of the parallel mechanism P. As a result, between the hinge points, maximum space becomes available for the extended spring 10*a*. In FIG. 9 the spring 10A is designed as a package of several springs 10B with the same suspension points. The tuning of the correct bias of the spring 10*a* is done with a screw 15 or the like in a point near the other lower hinge point S.

The use of a ribbon, owing to its minimal thickness, will yield fewer deviations in the compensation force than a thicker cable.

The spring force should be exerted with positional accuracy between T and R, for a proper action without deviations in the force supplied. The pulley 14 has a certain finite diameter, so that the cable at suspension point T will run likewise on a body 16 having the same diameter, as in FIG. 9. As a result, the dimensions $r_a$ and a from equation 1 remain constant at a given setting, and as a result the whole equation remains valid and the action is preserved.

A design of the lift 1 in two tubular parts 17A, 17B which contain the whole spring, cable and motor mechanism has as an advantage that the bearing two parts 30, 31 of the parallel mechanism at the same time constitute the guard against the outside world. This provides for instance for as little material as possible being lost in packaging and prevents for instance fingers being caught between moving parts and prevents penetration of water and dust.

The rod assembly 2 comprises two rods 10, 11 in the horizontal plane. As a result, the danger of singular points is minimized or even eliminated.

The rod 10 situated closest to the main pivoting point B is the smallest in length so as to limit projection outside the wheelchair, and to enable just enough forward/backward movement. The second rod 11 is curved sufficiently (90° in the depicted design) to afford room to—that is, avoid collisions with—the elbow 18 upon tilting of the arm tray, and to enable the shoulder on the other side of the body to be touched with a hand supported or guided by the arm tray 3, while this curvature projects just sufficiently little outside the wheelchair when the respective forearm rests on an armrest 8. Any singular points of the DAS rod assembly are situated in principle at the ends of the working range, so that, practically, they do not hinder the user. Without being exhaustive or limiting, the following can be mentioned as advantages of the DAS:

The DAS does not have too many DOFs in the horizontal plane:

Any singular points exist only in known, predictable orientations of the rod assembly and can occur only at the extreme limits of the working range. The rod assembly may, at a fixed arm position, itself too have a fixed position. The rods then will not swing out uncontrollably and can move when the arm is fixed, for instance in case of rocking of the wheelchair when transported on wheels (in a taxi).

The DAS does not have too few DOFs in the horizontal plane:

The arm tray 3 and hence the user's arm can take any random position in the horizontal plane, but, apart from this, also any random orientation in other planes (by rotation about vertical axis D), since the DAS here has three DOFs.

The DAS rod assembly has a main pivoting point B which is displaceable during use. The precise working range of the DAS, and the extent to which it extends closely alongside the user and seat at specific arm orientations, can be optimized during use through displacement of the main pivoting point B of the rod assembly 2. When unexpectedly something moves, as upon adjustment of the wheelchair back 6A, 19 (in FIG. 6), a rear-end collision or one against the rod assembly, or being caught on something, the main pivoting point of the rod assembly yields and moves, resulting in less great/dangerous forces on the user's arm. Hence this functions as a slipping clutch in the vertical tube 7 for safety.

The design of the DAS as depicted in FIGS. 5, 6 and 9 moreover has two angular adjustments on the vertical tube, to set the latter and the rest of the rod assembly plumb.

DAS modules are preferably detachable, so that the wheelchair can be used without hindrance from residual parts. The tube 7 may for instance be slidably detachable from the DAS lift 1, the rods 10, 11 may be designed to be slidably detachable from the vertical tube 7, and the arm tray 3 may be slidably detachable from the rod assembly 2.

Figure 10:
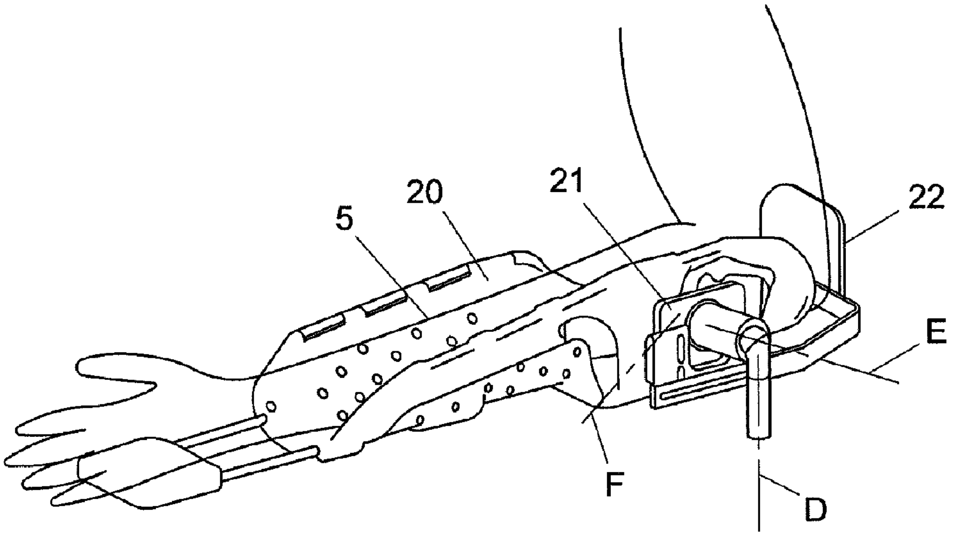
FIG. 10 shows an arm in an arm support, with approximately horizontal forearm.

Most parts do not need to be specific for a left- or right-hand version, for instance only the tray part of the arm tray 20 in FIG. 10 and a horizontal tube 10 in FIG. 6.

The DAS arm tray preferably comprises a tray part 20 and a connecting part 21 with the tilting axis E to the rod assembly 2. An elbow support 22 may be connected to the connecting part mentioned, preferably rigidly so. Tilting is possible about a preferably horizontal axis E, hence without preferred position for minimum required muscular strength upon movement. This tilting does not need to be coupled to a rotation about a vertical or oblique axis but preferably has its own degree of freedom, and can move both up and down. This results in the greatest freedom of movement.

Figure 12:
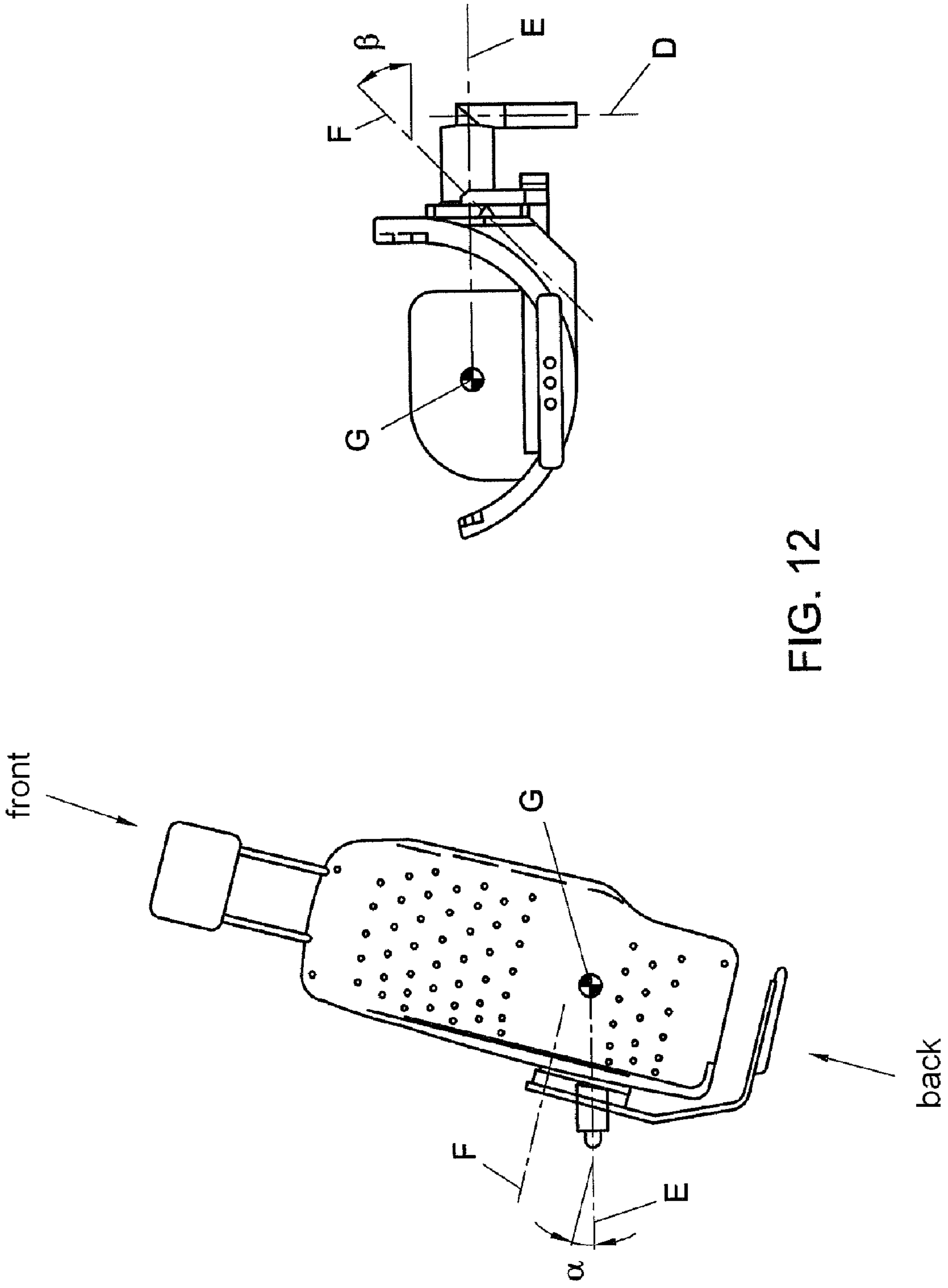

The tilting axis E of the arm tray 3 in FIG. 5 is slightly skewed at an angle, for instance angle $\alpha$ in FIG. 12 of for instance approximately 15° towards the back, so that, for instance upon a natural drinking movement, a minimal amount of joints of the rod assembly need to hinge.

When the hand of the user is raised high, the forearm angle moves towards the vertical. By virtue of the slightly skewed ($\alpha$ in FIG. 12) tilting axis E with respect to the arm tray, the vertical orientation—and a small conical space (apex $2\times\alpha$) around it—cannot be reached by the forearm. This precludes the forearm tilting beyond the vertical, in which case the forearm might not be supported by the arm tray anymore, because it does not rest on anything. With the DAS, there is ongoing contact between the forearm and the arm tray and its elbow support.

Figure 11:
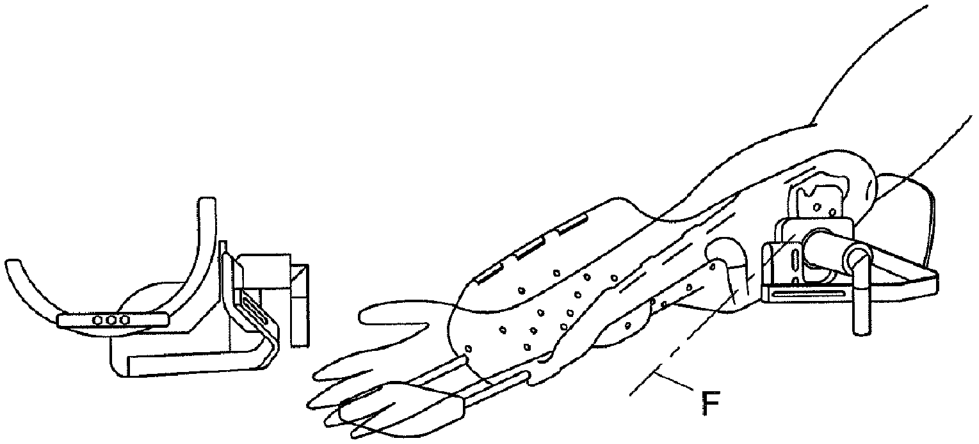
FIG. 11 shows an arm in an arm support, in substantially extended condition.

The arm tray can be a tray part that is accessible to the forearm to freely place it therein and remove it therefrom, without clamping or retaining means. However, if so desired, fixation with the aid of straps, etc., is very well possible. The tray edges (see FIG. 11 left and FIG. 12 right) on opposite sides of the forearm are high enough to provide support also when the arm tray is tilted towards the face, for instance to drink.

The elbow support and the arm tray may be connected by means of a hinge axis F which again is oriented askew ($\beta$ in FIG. 12; angle 45°) with respect to the vertical plane parallel to the forearm 5 in FIG. 10; upon extension of the arm (see FIG. 11) the elbow support thereby affords room for the upper arm, while upon raising of the hand this elbow support can give support as in FIG. 5.

The tray part 20 in FIG. 10 is preferably connected to the connecting part/elbow support 21 by means of a skew hinge axis F, and the connecting part/elbow support is preferably connected to the rod assembly by means of a slightly skewed tilting axis E. The tilting axis E in turn may be rotatable about a vertical axis D at the end of the rod assembly 2 in FIG. 5.

When the upper arm and forearm are in a horizontal plane (at shoulder height), or when the upper arm is oriented vertically downwards (for instance with the forearm at rest on the armrest), and in all intermediate positions, it is possible to extend the arm and to swing the elbow support clear. This is possible by virtue of the preferably skewed hinge axis F (with angle $\beta$), because a pressure at right angles to the direction of movement of the elbow support is minimal or even does not occur. See FIG. 11.

The composite center of gravity G (FIG. 12) of the arm—at approximately ⅓ forearm's length from the elbow—is situated behind the hinge axis F, as long as the hand is not moved down farther than a certain point by tilting of the forearm. The friction that fixes the forearm in the arm tray will, rather, be limiting to the extent of tilting; that is to say, the arm will slide forwards out of the cup rather than undesirably tilting forwards relative to the elbow support.

Figures 3, 4:
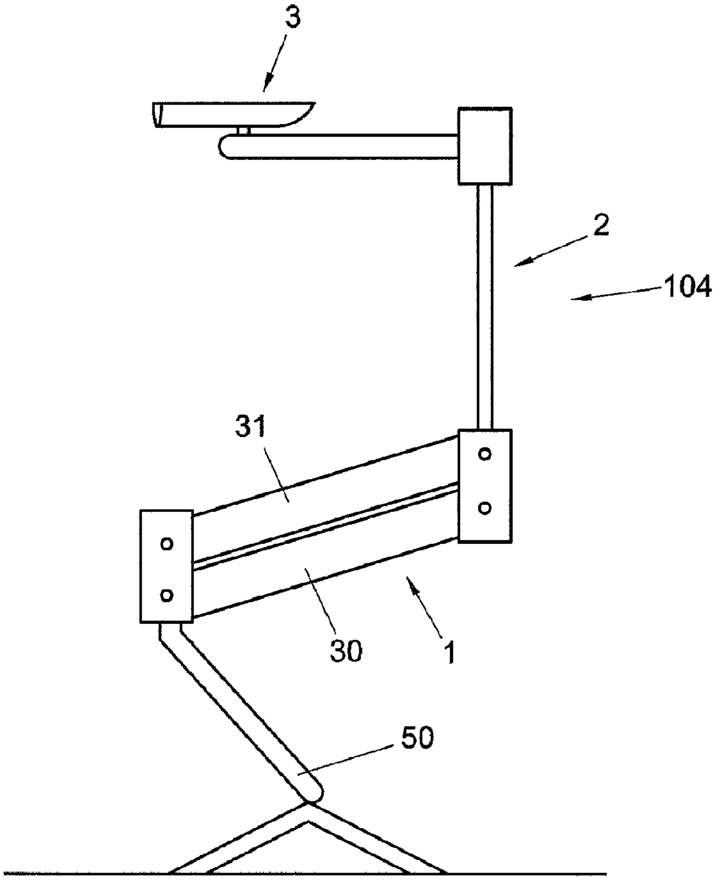
FIG. 3 shows a diagram of operating functions of control buttons.
FIG. 4 schematically shows an arm support on a stand.

The DAS preferably has an electronics module 44 which comprises for instance completely analog electronics which causes the actuator to cut out at the ends of its stroke, generally prevents burnout and overloading of the motor M, and can contain for instance the menu structure. Naturally, these functions can be accomplished in many ways, as by the use of PLCs or through suitable software and a processor and/or for instance servo motors, linear motors, and the like. DAS can be operable with any two or more switches 40, 41, 42 and the menu structure preferably makes functional expansion of the DAS possible. The electronics module 44 preferably provides in addition that opposite input (simultaneously pressing two buttons for motor forward/reverse) does not result in any movement and/or damage, and that reversing the polarity of the electric supply does not cause any damage. FIG. 3 schematically represents a possible structure, or at least a function diagram of three buttons 40, 41, 42.

FIG. 4 schematically shows an arm support 104 on a stand 50.

The invention is not limited in any way to the embodiments shown in the description and the drawings. Many variations thereon are possible within the framework of the invention outlined by the claims. For instance, electric or electronic drives may be provided for the arm support, two of such arm supports may be provided, the lift device may be designed differently, for instance as a linearly working lift device as with tubes sliding in and/or over or along each other, mutually spring-supported, and as sitting support a different element may be used. The arm tray may be provided with operating means such as an emergency switch and/or sensors such as a pressure sensor which can stop a control of the arm support and/or the wheelchair or can bring it in a neutral position when the pressure on the sensor falls below a minimum value. The lift device may extend forwards or possibly at least partly sideways.

What is claimed:

1. An arm support, comprising an arm supporting element, connected via a connecting device with a lift device, wherein the arm supporting element has a longitudinal direction between a front end and a rear end and is connected via a tilting axis (E) with the connecting device, wherein the lift device comprises compensation means for bearing the weight of the arm support and a load borne thereon, in particular an arm of a user, wherein the compensation means comprise a parallelogram construction including two parallel arms, and wherein the compensation means further comprise a spring assembly including a draw spring and a cable-pulley system, and wherein a first application point of the draw spring is on a first of the two parallel arms, and wherein a second application point of the draw spring is on a second of the two parallel arms, and wherein a force of the draw spring is applied to the second application point via a cable of the cable-pulley system.

2. The arm support according to claim 1, wherein the compensation means are configured such that, upon a vertical movement of an arm supported by the arm supporting element, or at least of a center of gravity thereof, the lift device, and hence the arm supporting element, follows this movement while contact between the arm and the arm supporting element is preserved, and such that when the arm is at rest, the downward force of gravity exerted on the arm is substantially in equilibrium with an upward force exerted thereon by the compensation means.

3. The arm support according to claim 1, wherein the parallelogram construction includes four pivoting points P, Q, R, S, wherein the first of the parallel arms extends between pivoting points R and S, and wherein the second of the parallel arms extends between pivoting points P and Q, and wherein the first application point of the draw spring is at R, and wherein the second application point of the draw spring is in between P and Q.

4. The arm support according to claim 3, constructed such that the following equation applies:

$$m \cdot g \cdot L = r_a \cdot a \cdot k,$$

wherein m is the mass of the weight of the arm support and the load borne thereon, in particular an arm of a user; g is earth's gravitational acceleration; L is a length of the two parallel arms; $r_a$ is a distance between the second point of application and pivoting point P; a is a distance between the pivoting points Q, S and P, R of the two parallel arms; and k is a spring constant of the draw spring.

5. The arm support according to claim 1, wherein the cable-pully system includes a pulley that is situated at the first application point, and a body (16) that is situated at the second application point, and wherein the pulley and the body have a same diameter, and wherein the cable of the cable-pulley system runs over both the pulley and the body.

6. The arm support according to claim 1, wherein the second application point of the draw spring is movable along the second arm by means of a motor, so as to adjust a compensation force of the compensation means.

7. The arm support according to claim 1, wherein the cable of the cable-pully system is formed by a ribbon.

8. The arm support according to claim 7, wherein the ribbon is a Kevlar woven ribbon.

9. The arm support according to claim 1, wherein the draw spring of the spring assembly extends along the first arm.

10. The arm support according to claim 1, wherein each of the two parallel arms is formed by a tubular part, which parts contain the draw spring of the spring assembly.

11. The arm support according to claim 1, wherein the compensation means include a screw or the like that is connected to the draw spring which enables one to tune the bias of the draw spring.

12. A sitting support provided with an arm support according to claim 1.

13. The sitting support according to claim 12, wherein the sitting support comprises a wheel chair, provided with a seat, wherein the lift device of the arm support extends substantially next to and/or under the seat.

14. The sitting support according to claim 12, provided with an arm support wherein the parallelogram construction includes four pivoting points P, Q, R, S, wherein the first of the parallel arms extends between pivoting points R and S, and wherein the second of the parallel arms extends between pivoting points P and Q, and wherein the first application point of the draw spring is at R, and wherein the second application point of the draw spring is in between P and Q, wherein the pivoting points Q and S of the parallelogram construction are attached to the sitting support.

15. The sitting support according to claim 14, wherein the lift device, from the pivoting points Q, S attached to the sitting support, extends substantially backwards viewed in a normal direction of travel of the wheelchair.

16. An arm support, comprising an arm supporting element, connected via a connecting device with a lift device, wherein the arm supporting element has a longitudinal direction between a front end and a rear end and is connected via a tilting axis (E) with the connecting device, wherein the lift device comprises compensation means for bearing the weight of the arm support and a load borne thereon, in particular an arm of a user, wherein the compensation means comprise a parallelogram construction including two parallel arms, and wherein the compensation means further comprise a spring assembly including a draw spring and a cable-pulley system, wherein each of the two parallel arms is formed by a tubular part, which parts contain the draw spring of the spring assembly, and wherein a first application point of the draw spring is on a first of the two parallel arms, and wherein a second application point of the draw spring is on a second of the two parallel arms.

17. The arm support according to claim 16, wherein the second application point of the draw spring is movable along the second arm by means of a motor, so as to adjust a compensation force of the compensation means.

18. The arm support according to claim 16, wherein the tubular parts contain the cable-pulley system and the motor.

19. An arm support, comprising an arm supporting element, connected via a connecting device with a lift device, wherein the arm supporting element has a longitudinal direction between a front end and a rear end and is connected via a tilting axis (E) with the connecting device, wherein the lift device comprises compensation means for bearing the weight of the arm support and a load borne thereon, in particular an arm of a user, wherein the compensation means comprise a parallelogram construction including two parallel arms, and wherein the compensation means further comprise a spring assembly including a draw spring and a cable-pulley system, wherein the compensation means include a screw or the like that is connected to the draw spring which enables one to tune the bias of the draw spring, and wherein a first application point of the draw spring is on a first of the two parallel arms, and wherein a second application point of the draw spring is on a second of the two parallel arms.

* * * * *